United States Patent
Nakaya et al.

(10) Patent No.: US 10,280,258 B2
(45) Date of Patent: May 7, 2019

(54) METHOD FOR PRODUCING OXYMETHYLENE COPOLYMER

(71) Applicant: MITSUBISHI GAS CHEMICAL COMPANY, INC., Tokyo (JP)

(72) Inventors: Daigo Nakaya, Tokyo (JP); Toru Takahashi, Tokyo (JP); Satoshi Mochida, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/901,783

(22) PCT Filed: Jun. 30, 2014

(86) PCT No.: PCT/JP2014/067426
§ 371 (c)(1),
(2) Date: Dec. 29, 2015

(87) PCT Pub. No.: WO2015/002147
PCT Pub. Date: Jan. 8, 2015

(65) Prior Publication Data
US 2016/0369050 A1    Dec. 22, 2016

(30) Foreign Application Priority Data

Jul. 1, 2013 (JP) ................. 2013-137734
Jul. 1, 2013 (JP) ................. 2013-137735

(51) Int. Cl.
| | | |
|---|---|---|
| *C08G 65/10* | (2006.01) | |
| *C08G 65/30* | (2006.01) | |
| *C08K 5/13* | (2006.01) | |
| *C08K 5/3492* | (2006.01) | |
| *C08G 2/04* | (2006.01) | |
| *C08G 2/06* | (2006.01) | |
| *C08G 2/10* | (2006.01) | |
| *C08G 2/24* | (2006.01) | |
| *C08L 59/04* | (2006.01) | |

(52) U.S. Cl.
CPC ............. *C08G 65/10* (2013.01); *C08G 2/04* (2013.01); *C08G 2/06* (2013.01); *C08G 2/10* (2013.01); *C08G 2/24* (2013.01); *C08G 65/30* (2013.01); *C08K 5/13* (2013.01); *C08K 5/3492* (2013.01); *C08L 59/04* (2013.01)

(58) Field of Classification Search
CPC .. C08G 2/06; C08G 2/10; C08G 65/10; C08G 65/30; C08F 4/00; C08F 4/06; C08F 4/10; C08K 5/13; C08K 5/3492
See application file for complete search history.

(56) References Cited

U.S. PATENT DOCUMENTS

| | | | | |
|---|---|---|---|---|
| 4,087,411 A | * | 5/1978 | Sugio ............... | C08G 2/10 525/398 |
| 7,902,324 B2 | * | 3/2011 | Hoffmockel ....... | C08G 2/06 252/182.13 |
| 2006/0252912 A1 | * | 11/2006 | Hoffmockel ....... | C08G 2/08 528/425 |
| 2008/0097077 A1 | * | 4/2008 | Assmann .......... | C08G 2/12 528/425 |
| 2008/0234459 A1 | | 9/2008 | Lang et al. | |
| 2012/0232246 A1 | | 9/2012 | Haubs et al. | |
| 2013/0018170 A1 | | 1/2013 | Hoffmockel et al. | |

FOREIGN PATENT DOCUMENTS

| | | |
|---|---|---|
| EP | 2 066 704 | 6/2009 |
| JP | 63-9527 | 2/1988 |
| JP | 2000-191738 | 7/2000 |
| JP | 2000191738 A * | 7/2000 |
| JP | 3359748 | 10/2002 |
| JP | 2008-195777 | 8/2008 |
| JP | 2008195777 A * | 8/2008 |
| JP | 2009-506155 | 2/2009 |
| JP | 2009-227894 | 10/2009 |
| JP | 2009-249451 | 10/2009 |
| JP | 2009227894 A * | 10/2009 |
| JP | 2010-504380 | 2/2010 |
| JP | 2011-137087 | 7/2011 |
| WO | 2008/034571 | 3/2008 |

OTHER PUBLICATIONS

JP 2000191738 A, Jul. 2000, English Ab.*
JP 2008195777 A, Aug. 2008, Machine translation.*
JP 2009227894 A, Oct. 2009, Machien translation.*
International Search Report issued in PCT/JP2014/067426, dated Sep. 16, 2014.
Extended European Search Report issued in Patent Application No. 14819262.8, dated Feb. 6, 2017.

* cited by examiner

*Primary Examiner* — Satya B Sastri
(74) *Attorney, Agent, or Firm* — Greenblum & Bernstein, P.L.C

(57) ABSTRACT

The present invention provides a method for producing an oxymethylene copolymer which involves polymerizing trioxane and a comonomer cationically at a polymerization temperature of 135° C. to 300° C. in the presence of a protic acid salt having the molecular weight of 1000 or less, and at least one polymerization initiator selected from the group consisting of protic acids, protic acid anhydrides, and protic acid ester compounds having the molecular weight of 1000 or less.

11 Claims, No Drawings

METHOD FOR PRODUCING OXYMETHYLENE COPOLYMER

TECHNICAL FIELD

The present invention relates to a method for producing an oxymethylene copolymer.

BACKGROUND ART

Oxymethylene polymers have excellent mechanical and thermal performances and, in particular, since oxymethylene copolymers have even better thermal stability and moldability than those of oxymethylene homopolymers, oxymethylene copolymers have been used as engineering plastics. Regarding methods of producing an oxymethylene copolymer, a method for producing an oxymethylene copolymer which involves bulk polymerization of trioxane and a comonomer at a temperature of 135 to 300° C. using a polymerization initiator and allows the monomer and a produced polymer to exist in a molten state during the polymerization has been publicly known (e.g., see Japanese Patent Publication No. S63-9527 (examined, approved Japanese patent application published for opposition)).

Furthermore, as a method for continuously producing oxymethylene copolymer in a homogeneous phase, a technique which involves deactivation of a polymerization initiator after polymerization is performed using a protic acid as the polymerization initiator in a cylindrical reaction vessel having a fixed stirring member, and then removal of volatile components, such as remaining monomers, from the reaction mixture by vaporization has been publicly known (e.g., see Registered Japanese Patent No. 3359748).

The Registered Japanese Patent No. 3359748 describes a production technique of an oxymethylene copolymer that can be performed using a simple and inexpensive static mixer type manufacturing facilities, without using special manufacturing facilities that are required to polymerize, pulverize, mix, melt, or transfer solid or powder, by polymerizing a monomer and a polymer in a molten state.

PRIOR ART DOCUMENTS

Patent Documents

Patent Document 1: Japanese Patent Publication No. S63-9527 (examined, approved Japanese patent application published for opposition)
Patent Document 2: Registered Japanese Patent No. 3359748

SUMMARY OF THE INVENTION

Problems to be Solved by the Invention

However, production of a high molecular weight polymer is difficult for conventional production methods, and development of a method for producing a polymer having a high molecular weight at high yield has been desired for production technique of an oxymethylene copolymer that polymerizes a monomer and a polymer while maintaining the molten state.

In the light of the current circumstances, an object of the present invention is to provide a production method that can produce an oxymethylene copolymer having a high molecular weight at high yield.

Means for Solving the Problems

As a result of diligent research to solve the above problems, the inventors of the present invention have found that the above object can be achieved by, in a method for producing an oxymethylene copolymer which cationically polymerizes trioxane and a comonomer, performing the polymerization reaction by using a protic acid or the like as a polymerization initiator under particular conditions and adding a protic acid salt, and thus completed the present invention.

The present invention relates to a method for producing an oxymethylene copolymer in which, in a method for producing an oxymethylene copolymer that cationically polymerizes trioxane and a comonomer, a polymerization reaction is performed at a polymerization temperature of 135° C. to 300° C. by using protic acid, protic acid anhydride, or a protic acid ester compound having the molecular weight of 1000 or less as a polymerization initiator and by adding a protic acid salt having the molecular weight of 1000 or less.

That is, the present invention is a method for producing an oxymethylene copolymer which includes a polymerization step in which trioxane and a comonomer are cationically polymerized at a polymerization temperature of 135° C. to 300° C. in the presence of at least one protic acid salt having the molecular weight of 1000 or less, and at least one polymerization initiator selected from the group consisting of protic acids, protic acid anhydrides, and protic acid ester compounds having the molecular weight of 1000 or less.

Effect of the Invention

According to the present invention, a production method that can produce an oxymethylene copolymer having a high molecular weight at high yield can be provided.

MODE FOR CARRYING OUT THE INVENTION

In the present description, the term "step" encompasses not only an independent step but also a step in which anticipated effect of this step is achieved. In addition, a numerical value range indicated by use of the term "to" as used herein refers to a range including the numerical values described before and after "to" as the minimum and maximum values, respectively. Unless specifically indicated, when an each ingredient of a composition includes a plurality of materials, a content of the each ingredient of the composition denotes the total amount of the plurality of materials included in the composition.

The method for producing an oxymethylene copolymer of the present invention includes a polymerization step in which trioxane and a comonomer are cationically polymerized at a polymerization temperature of 135° C. to 300° C. in the presence of at least one protic acid salt having the molecular weight of 1000 or less, and at least one polymerization initiator selected from the group consisting of protic acids, protic acid anhydrides, and protic acid ester compounds having the molecular weight of 1000 or less.

According to the method for producing an oxymethylene copolymer, production, at high yield, of an oxymethylene copolymer having a high molecular weight is possible using simple and inexpensive manufacturing facilities for treating liquids, such as a static mixer, without using special manufacturing facilities that are required to polymerize, pulverize, mix, melt, or transfer solid or powder. Therefore, the production method of the present invention is industrially significant. The present invention will be described below in detail.

The trioxane used as a monomer is a cyclic trimer of formaldehydes, and the production method thereof is not particularly limited. The trioxane may optionally contain a stabilizer. When the trioxane contains a stabilizer to enhance the stability during storage or the like, for example, it is preferable to contain typically 0.00001 to 0.003 mmol, preferably 0.00001 to 0.0005 mmol, and more preferably 0.00001 to 0.0003 mmol, of amine compound per 1 mol of trioxane. When the content of the amine compound is 0.003 mmol or less, negative effects such as deactivation of the polymerization initiator are less likely to occur, and when the content is 0.00001 mmol or greater, generation of paraformaldehyde or the like during the storage of the trioxane is suppressed.

Examples of the amine compound that can be contained in the trioxane include primary amines, secondary amines, tertiary amines, alkylated melamines, hindered amine compounds, and the like. The amine compound can be used individually or in combination. As the primary amine, n-propylamine, isopropylamine, n-butylamine, or the like is suitably used. As the secondary amine, diethylamine, di-n-propylamine, diisopropylamine, di-n-butylamine, piperidine, morpholine, or the like is suitably used. As the tertiary amine, triethylamine, tri-n-propylamine, triisopropylamine, tri-n-butylamine, triethanolamine, or the like is suitably used. As the alkylated melamine, mono-, di-, tri-, tetra-, penta-, or hexa-methoxymethylmelamine, which is methoxymethyl-substituted melamine, a mixture thereof, or the like is suitably used. As the hindered amine compound, bis(2,2,6,6-tetramethyl-4-piperidinyl) sebacate, bis(1,2,2,6,6-pentamethyl-4-piperidinyl) sebacate, 1,2,3,4-butanetetracarboxylic acid tetrakis(2,2,6,6-tetramethyl-4-piperidinyl) ester, poly[[6-(1,1,3,3-tetramethylenebutyl)amino-1,3,5-triazine-2,4-diyl][(2,2,6,6-tetramethyl-4-piperidinyl)imino] hexamethylene[(2,2,6,6-tetramethyl-4-piperidinyl)imino], 1,2,2,6,6,-pentamethylpiperidine, dimethyl succinate/1-(2-hydroxyethyl)-4-hydroxy-2,2,6,6-tetramethylpiperidine polycondensates, N,N'-bis(3-aminopropyl)ethylenediamine/2,4-bis[N-butyl-N-(1,2,2,6,6-pentamethyl-4-piperidyl) amino]-1,3,5-triazine condensates, or the like is suitably used. Among these, triethanolamine is the most suitably used.

The comonomer is a comonomer that provides an oxyalkylene unit having 2 or more carbons, preferably a comonomer that provides an oxyalkylene unit having 2 to 6 carbons, and particularly preferably a comonomer that provides an oxyethylene unit having 2 carbons. The comonomer is not particularly limited as long as the comonomer is a comonomer that is copolymerizable with trioxane, such as a cyclic ether, glycidyl ether compound, and cyclic formal. Specific examples of the comonomer include ethylene oxide, propylene oxide, butylene oxide, styrene oxide, methyl glycidyl ether, ethyl glycidyl ether, phenyl glycidyl ether, 1,3-dioxolane, propylene glycol formal, diethylene glycol formal, triethylene glycol formal, 1,3,5-trioxepane, 1,4-butanediol formal, 1,5-pentanediol formal, 1,6-hexanediol formal, and the like, and at least one selected from the group consisting of these can be used. As the comonomer, at least one selected from the group consisting of ethylene oxide, 1,3-dioxolane, diethylene glycol formal, and 1,4-butanediol formal is preferably used. In view of copolymerizability with trioxane, 1,3-dioxolane is particularly preferably used.

The amount of the comonomer added is 0.4 to 45% by mass, preferably 1.2 to 12% by mass, and most preferably 2.5 to 6% by mass, relative to the amount of trioxane. When the used amount of the comonomer is 45% by mass or less, polymerization yield and crystallization rate are less likely to decrease, and when the used amount of the comonomer is 0.4% by mass or greater, unstable portion decreases.

The polymerization initiator is a protic acid which is a cationic polymerization initiator that is typically used in copolymerization of trioxane and a comonomer, and also a protic acid anhydride or protic acid ester compound may be used. The molecular weight of these needs to be a molecular weight of 1000 or less to produce a high molecular weight copolymer. That is, the polymerization initiator is at least one selected from the group consisting of protic acids, protic acid anhydrides, and protic acid ester compounds having the molecular weight of 1000 or less.

The molecular weight of the polymerization initiator is 1000 or less, preferably 800 or less, and more preferably 500 or less. The lower limit of the molecular weight is not particularly limited. The molecular weight is, for example, 20 or greater, and preferably 36 or greater.

Examples of the protic acid, protic acid anhydride, and protic acid ester compound include perchloric acid and derivatives thereof, such as perchloric acid, perchloric acid anhydrides, and acetyl perchlorate; fluorinated or chlorinated alkylsulfonic acids and arylsulfonic acids, acid anhydrides thereof, and ester compounds thereof, such as trifluoromethanesulfonic acid and trifluoromethanesulfonic acid anhydrides; phosphinic acids or phosphonic acids and derivatives thereof, such as bis(trifluoromethyl)phosphinic acid and trifluoromethylphosphonic acid; and the like. These may be used individually or in combination. Among these, at least one selected from the group consisting of perchloric acid, perfluoroalkylsulfonic acid, acid anhydrides thereof, and ester compounds thereof is preferable. Taking production efficiency and economic efficiency into consideration, at least one selected from the group consisting of perchloric acid, perchloric acid anhydride, and perchloric acid ester compounds is the most preferable.

The amount of the polymerization initiator added (content in the reaction system) is typically in the range of 0.001 ppm by mass to 10% by mass, preferably in the range of 0.001 to 500 ppm by mass, more preferably in the range of 0.01 to 200 ppm by mass, and most preferably in the range of 0.01 to 100 ppm by mass, relative to the amount of the trioxane in the main monomer. When the amount of the polymerization initiator added is 10% by mass or less, reduction in the molecular weight or the like is less likely to occur, and when the amount of the polymerization initiator added is 0.001 ppm by mass or greater, reduction in rate of polymerization conversion is less likely to occur.

The reason why the molecular weight and the polymerization yield are increased by a combined use of the polymerization initiator (at least one selected from the group consisting of protic acids, protic acid anhydrides, and protic acid esters having the molecular weight of 1000 or less) and the protic acid salt is assumed to be due to the growth reaction of the copolymer becoming relatively predominant since the decomposition reaction of the copolymer during the polymerization is suppressed by a combined use of the polymerization initiator and the protic acid salt. That is, for example, it is assumed that, at a polymerization temperature of 135° C. or higher, the decomposition reaction in which an active site of the copolymer attacks the copolymer itself, that is typically referred to as "back-biting", is suppressed by the presence of the protic acid salt at a desirable position which is close to the active site of the copolymer.

The polymerization initiator is used in itself or used in a solution state. That is, all or part of the polymerization initiator may be used after dilution with a solvent. When the polymerization initiator is used as a solution, the solvent is not particularly limited; however, examples of the solvents include aliphatic hydrocarbon solvents, such as hexane, heptane, and cyclohexane; aromatic hydrocarbon solvents, such as benzene, toluene, and xylene; ether solvents, such as 1,2-dimethoxyethane, diethylene glycol dimethyl ether, triethylene glycol dimethyl ether, and 1,4-dioxane. Among these, although it is not a mandatory requirement in the present invention, a solvent having the boiling point at 1 atm of 115° C. or lower is preferable. Such a solvent can be easily separated from the produced copolymer and the collected trioxane by distillation. Furthermore, a part of or the entire amount of the comonomer, such as 1,3-dioxolane, may be used as a solvent.

The protic acid salt is not particularly limited as long as the protic acid salt is a salt produced by the alkaline component and the protic acid. The protic acid salt is produced by a cation derived from the alkaline component and an anion derived from the protic acid.

In view of production efficiency, the protic acid salt is preferably a salt produced by a protic acid and at least one type of alkaline component selected from the group consisting of alkali metals, alkaline earth metals, ammonia, and amine compounds, and more preferably the alkaline component is at least one selected from the group consisting of alkali metals and alkaline earth metals.

The protic acid constituting the protic acid salt is a compound that releases a proton, and is a protic acid having a molecular weight of 1000 or less to produce a high molecular weight copolymer. The molecular weight of the protic acid is preferably 800 or less, and more preferably 500 or less. The lower limit of the molecular weight of the protic acid is not particularly limited. The molecular weight is, for example, 20 or greater, and preferably 36 or greater.

Examples of the protic acid include inorganic acids, such as sulfuric acid, hydrochloric acid, phosphoric acid, and perchloric acid; and organic acids, such as fluorinated or chlorinated alkylsulfonic acids and arylsulfonic acids. Among these, at least one selected from the group consisting of perchloric acid and perfluoroalkylsulfonic acids is more preferable. Taking production efficiency and economic efficiency into consideration, perchloric acid is the most preferable.

The alkaline component constituting the salt together with the protic acid is preferably at least one selected from the group consisting of alkali metals, alkaline earth metals, ammonia, and amine compounds, and more preferably the alkaline component is at least one selected from the group consisting of alkali metals and alkaline earth metals.

The alkali metal include lithium, sodium, potassium, rubidium, caesium, and the like. The alkaline earth metal is an alkaline earth metal in a broad sense, and the alkaline earth metal include beryllium and magnesium as well as calcium, strontium, barium, and radium. The amine compound include a primary amine, secondary amine, tertiary amine, alkylated melamine, and hindered amine compound. As the primary amine, n-propylamine, isopropylamine, n-butylamine, or the like is suitably used. As the secondary amine, diethylamine, di-n-propylamine, diisopropylamine, di-n-butylamine, piperidine, morpholine, or the like is suitably used. As the tertiary amine, triethylamine, tri-n-propylamine, triisopropylamine, tri-n-butylamine, or the like is suitably used. As the alkylated melamine, mono-, di-, tri-, tetra-, penta-, or hexa-methoxymethylmelamine, which is methoxymethyl-substituted melamine, a mixture thereof, or the like is suitably used. As the hindered amine compound, bis(2,2,6,6-tetramethyl-4-piperidinyl) sebacate, bis(1,2,2,6,6-pentamethyl-4-piperidinyl) sebacate, 1,2,3,4-butanetetracarboxylic acid tetrakis(2,2,6,6-tetramethyl-4-piperidinyl) ester, poly[[6-(1,1,3,3-tetramethylenebutyl)amino-1,3,5-triazine-2,4-diyl][(2,2,6,6-tetramethyl-4-piperidinyl)imino] hexamethylene[(2,2,6,6-tetramethyl-4-piperidinyl)imino], 1,2,2,6,6,-pentamethylpiperidine, dimethyl succinate-1-(2-hydroxyethyl)-4-hydroxy-2,2,6,6-tetramethylpiperidine polycondensates, N,N'-bis(3-aminopropyl)ethylenediamine-2,4-bis[N-butyl-N-(1,2,2,6,6-pentamethyl-4-piperidyl) amino]-1,3,5-triazine condensates, or the like is suitably used.

As the protic acid salt, a pure substance, that is a compound isolated as a salt, may be used, or a substance produced by acid-alkali reaction may be used without purification. When the substance produced by acid-alkali reaction is used without purification, as the alkali component, a single alkali metal, a single alkaline earth metal, ammonia, an amine compound, or a hydroxide, alcoholate, organic salt, inorganic salt, or oxide of an alkali metal or alkaline earth metal, or the like is suitably used.

The amount of the protic acid salt added (content in the reaction system) is typically in the range of 0.001 ppm by mass to 10% by mass, preferably in the range of 0.01 ppm by mass to 1% by mass, and most preferably in the range of 0.01 ppm by mass to 100 ppm by mass, relative to the amount of the trioxane in the main monomer. When the amount of the protic acid salt added is 10% by mass or less, reductions in the molecular weight or polymerization yield or the like are less likely to occur, and when the amount of the protic acid salt added is 0.001 ppm by mass or greater, increase in the molecular weight is achieved.

The protic acid salt is used in itself or used in a solution form or a suspension form. That is, all or part of the protic acid salt may be used after dilution with a solvent. When the protic acid salt is used as a solution or suspension, the solvent is not particularly limited; however, examples of the solvents include aliphatic hydrocarbon solvents, such as hexane, heptane, and cyclohexane; aromatic hydrocarbon solvents, such as benzene, toluene, and xylene; ether solvents, such as 1,2-dimethoxyethane, diethylene glycol dimethyl ether, triethylene glycol dimethyl ether, and 1,4-dioxane. Among these, although it is not a mandatory requirement in the present invention, a solvent having the boiling point at 1 atm of 115° C. or lower is preferable. Such a solvent can be easily separated from the produced copolymer and the collected trioxane by distillation. Furthermore, a part of or the entire amount of the comonomer and monomer, such as trioxane and 1,3-dioxolane, may be used as a solvent. Furthermore, the solvent may be added to the monomer by mixing in advance with the polymerization initiator.

The mole ratio of the polymerization initiator (preferably protic acid) to the protic acid salt is not particularly limited. In view of molecular weight and polymerization yield, the mole ratio is preferably in the range of 1:0.01 to 1:2000, more preferably in the range of 1:0.05 to 1:10, and most preferably in the range of 1:0.1 to 1:5.

In the method for producing an oxymethylene copolymer, polymerization reaction is preferably performed by adding a ketone compound in addition to the polymerization initiator (at least one selected from the group consisting of protic acids, protic acid anhydrides, and protic acid esters having the molecular weight of 1000 or less) and the protic acid salt having the molecular weight of 1000 or less. That is, the polymerization reaction is preferably performed in the presence of a polymerization initiator, a protic acid salt having the molecular weight of 1000 or less, and a ketone compound.

The ketone compound is not particularly limited as long as the ketone compound is an aliphatic ketone or aromatic ketone. As the ketone compound, at least one selected from the group consisting of acetone, methyl ethyl ketone, methyl-n-propyl ketone, diethyl ketone, 2-hexanone, 3-hexanone, methyl-t-butyl ketone, di-n-propyl ketone, diisopropyl ketone, diisobutyl ketone, di-n-amyl ketone, stearone, chloroacetone, s-dichloroacetone, diacetyl, acetylacetone, mesityl oxide, phorone, cyclohexanone, and benzophenone is preferably used. These may be used individually or in combination. Among these, at least one selected from the group consisting of acetone, methyl ethyl ketone, methyl-n-propyl ketone, diethyl ketone, 2-hexanone, 3-hexanone, methyl-t-butyl ketone, di-n-propyl ketone, diisopropyl ketone, diisobutyl ketone, di-n-amyl ketone, diacetyl, acetylacetone, cyclohexanone, and benzophenone is more preferable, and acetone is the most preferable.

The amount of the ketone compound added (content in the reaction system) is typically in the range of 0.001 ppm by mass to 30% by mass, preferably in the range of 0.01 ppm by mass to 1% by mass, and most preferably in the range of 0.1 ppm by mass to 0.5% by mass, relative to the amount of the trioxane in the main monomer. When the amount of the ketone compound added is 30% by mass or less, reductions in the molecular weight or polymerization yield or the like are less likely to occur, and when the amount of the ketone compound added is 0.001 ppm by mass or greater, increases in the molecular weight or polymerization yield are achieved.

By a combined use of the polymerization initiator (at least one selected from the group consisting of protic acids, protic acid anhydrides, and protic acid esters having the molecular weight of 1000 or less), the protic acid salt, and the ketone compound, increase in the molecular weight and polymerization yield can be more efficiently achieved even at a higher polymerization temperature compared to the case where the polymerization initiator and the protic acid salt are used. For example, this is assumed to be due to the growth reaction of the copolymer becoming relatively predominant since the decomposition reaction of the copolymer during the polymerization is suppressed by the combined use of the ketone compound.

The ketone compound is used in itself or used in a solution form. That is, all or part of the ketone compound may be used after dilution with a solvent. When the ketone compound is used as a solution, the solvent is not particularly limited; however, examples of the solvents include aliphatic hydrocarbon solvents, such as hexane, heptane, and cyclohexane; aromatic hydrocarbon solvents, such as benzene, toluene, and xylene; ether solvents, such as 1,2-dimethoxyethane, diethylene glycol dimethyl ether, triethylene glycol dimethyl ether, and 1,4-dioxane. Among these, although it is not a mandatory requirement in the present invention, a solvent having the boiling point at 1 atm of 115° C. or lower is preferable. Such a solvent can be easily separated from the produced copolymer and the collected trioxane by distillation. Furthermore, a part of or the entire amount of the comonomer, such as 1,3-dioxolane, may be used as a solvent.

When the ketone compound is used in the polymerization reaction, the mole ratio of the polymerization initiator (preferably protic acid) to the ketone compound is preferably in the range of 1:0.1 to 1:100000, more preferably in the range of 1:5 to 1:10000, and most preferably in the range of 1:50 to 1:5000.

The intrinsic viscosity of the produced oxymethylene copolymer is typically adjusted to 0.5 to 5 dl/g. The intrinsic viscosity is preferably adjusted to 0.7 to 3.5 dl/g, and more preferably adjusted to 0.8 to 2.5 dl/g.

The polymerization step may be performed in the presence of a molecular weight modifier. For example, to adjust the molecular weight of the copolymer, 0.01 ppm by mass to 10% by mass, and preferably 0.1 ppm by mass to 1% by mass, of the molecular weight modifier relative to the amount of the trioxane can be used. Examples of the molecular weight modifier include carboxylic acid, carboxylic acid anhydride, esters, amides, imides, phenol compounds, acetal compounds, and the like, and at least one selected from the group consisting of these is preferable. In particular, at least one selected from the group consisting of phenol, 2,6-dimethylphenol, methylal, and polyoxymethylene dimethoxide is more suitably used. Methylal is the most preferable.

The molecular weight modifier is used in itself or used in a solution form. That is, all or part of the molecular weight modifier may be used after dilution with a solvent. When the molecular weight modifier is used as a solution, the solvent is not particularly limited; however, examples of the solvents include aliphatic hydrocarbon solvents, such as hexane, heptane, and cyclohexane; aromatic hydrocarbon solvents, such as benzene, toluene, and xylene; ether solvents, such as 1,2-dimethoxyethane, diethylene glycol dimethyl ether, triethylene glycol dimethyl ether, and 1,4-dioxane. Among these, although it is not a mandatory requirement in the present invention, a solvent having the boiling point at 1 atm of 115° C. or lower is preferable. Such a solvent can be easily separated from the produced copolymer and the collected trioxane by distillation. Furthermore, a part of or the entire amount of the comonomer, such as 1,3-dioxolane, may be used as a solvent.

The polymerization step is performed under pressurized conditions, which are the conditions pressurized to at least the vapor pressure in the polymerization machine or higher pressure, that is typically 0.15 to 50 MPa, and preferably 0.15 to 20 MPa.

The polymerization temperature needs to be a temperature that can maintain the produced copolymer to be in the liquid state from the time of charging the polymerization initiator till the time of charging the polymerization terminator, and the polymerization temperature is 135 to 300° C. The polymerization temperature is preferably in the temperature range of 140 to 220° C., and most preferably in the temperature range of 140 to 190° C. The polymerization step is performed while the polymerization temperature is maintained from the time of charging the polymerization initiator till the time of charging the polymerization terminator. When the polymerization temperature is 300° C. or lower, the molecular weight or polymerization yield of the produced copolymer is less likely to decrease, and when the polymerization temperature is 135° C. or higher, the produced copolymer is less likely to deposit as a solid, thereby enabling the production using a simple device for treating the copolymer as a liquid, which is the purpose of the present invention.

When the polymerization is performed at a temperature that can maintain the copolymer to be in the liquid state, since the polymerization reaction is a weakly endothermic reaction, the temperature of the polymerized mixture lowers as the polymerization progresses unless heat that is equal to or greater than heat of the reaction is supplied from the outside. On the other hand, when the polymerization is performed at a temperature that cannot maintain the copolymer to be in the liquid state, since the heat generated by the heat of crystallization of the copolymer is greater than the heat absorbed by the polymerization reaction, the temperature of the polymerized mixture increases as the polymerization progresses unless the difference of the generated heat thereof or a greater amount of heat is removed to the outside. Therefore, when the internal temperature is significantly increased by the polymerization, deposition of the copolymer is deemed to be caused. That is, in the present invention, the polymerization reaction is performed at a sufficiently high polymerization temperature in a manner that the maximum temperature difference from the time of charging the polymerization initiator till the time of charging the polymerization terminator is less than 20° C. even without performing a significant heat removal. By performing the polymerization reaction in this manner, troubles due to deposition of the copolymer during the polymerization reaction can be prevented when the production is performed using a simple and inexpensive polymerization facilities, such as a static mixer type reactor.

The polymerization time from the time of charging the polymerization initiator till the time of adding the polymerization terminator is typically 0.1 to 20 minutes, and preferably 0.4 to 5 minutes. When the polymerization time is 20 minutes or shorter, depolymerization is less likely to occur, and when the polymerization time is 0.1 minutes or longer, polymerization yield increases. Polymerization is performed under conditions such that the polymerization yield is typically 30% or greater, and more preferably 60% or greater.

Impurities contained in the trioxane, such as water, formic acid, methanol, formaldehyde, methylal, dioxymethylene dimethyl ether, and trioxymethylene dimethyl ether, are unavoidably generated when the trioxane is produced industrially; however, the total amount of the impurities is preferably 100 ppm by mass or less, more preferably 70 ppm by mass or less, and most preferably 50 ppm by mass or less, in the trioxane. In particular, the amount of water is preferably 50 ppm by mass or less, more preferably 20 ppm by mass or less, and most preferably 10 ppm by mass or less. Also for the 1,3-dioxolane, similarly to the trioxane, the total amount of the impurities, such as water, formic acid, and formaldehyde, that are present in the 1,3-dioxolane is preferably 1000 ppm by mass or less, more preferably 200 ppm by mass or less, particularly preferably 100 ppm by mass or less, and most preferably 50 ppm by mass or less.

The polymerization reaction can be solution polymerization performed in the presence of an inert solvent; however, solvent-free polymerization performed in substantially no presence of a solvent, which does not require costs for collecting the solvent, is preferable. When the solvent is used, the solvent is not particularly limited; however, examples of the solvents include aliphatic hydrocarbon solvents, such as hexane, heptane, and cyclohexane; aromatic hydrocarbon solvents, such as benzene, toluene, and xylene; ether solvents, such as 1,2-dimethoxyethane, diethylene glycol dimethyl ether, triethylene glycol dimethyl ether, and 1,4-dioxane. Among these, although it is not a mandatory requirement in the present invention, a solvent having the boiling point at 1 atm of 115° C. or lower is preferable. Such a solvent can be easily separated from the produced copolymer and the collected trioxane by distillation.

The polymerization reaction can be any of batch method or continuous method; however, the continuous method is preferable industrially. Examples of the devices used in the polymerization reaction include a shell type reactor, plow mixer, tubular reactor, list reactor, kneader (e.g., buss kneader), extruder provided with a single screw or twin screw, dynamic mixer type reactor, static mixer type reactor, and the like. Among these, a static mixer type reactor having a static mixing element but having no drive section is suitable. As the static mixing element inside the static mixer type reactor, a static mixing element which is composed of two types of elements that are in a form of a rectangular plate twisted clockwise by 180° and a form of a rectangular plate twisted counterclockwise by 180°, a static mixing element composed of planar criss-crossed lattice, and the like can be suitably used.

In the polymerization step, the copolymerization can be performed in the presence of a sterically hindered phenol compound. When the sterically hindered phenol compound is allowed to coexist, the content thereof is typically 0.0001 to 2.0% by mass, preferably 0.001 to 0.5% by mass, and more preferably 0.002 to 0.1% by mass, relative to the content of trioxane. When the used amount of the sterically hindered phenol compound is 2.0% by mass or less, reduction in the molecular weight of the produced oxymethylene copolymer, reduction of the polymerization yield, or the like is less likely to occur. When the used amount of the sterically hindered phenol compound is 0.0001% by mass or greater, production of the unstable portion, such as formic acid ester structure, of the oxymethylene copolymer is suppressed, and thus negative effects, such as reduction of thermal stability or hydrolysis stability, are not caused.

The sterically hindered phenol compound is added in itself or in a solution form to the trioxane. When the sterically hindered phenol compound is used as a solution, the solvent is not particularly limited; however, examples of the solvents include aliphatic hydrocarbon solvents, such as hexane, heptane, and cyclohexane; aromatic hydrocarbon solvents, such as benzene, toluene, and xylene; ether solvents, such as 1,2-dimethoxyethane, diethylene glycol dimethyl ether, triethylene glycol dimethyl ether, and 1,4-dioxane. Among these, although it is not a mandatory requirement in the present invention, a solvent having the boiling point at 1 atm of 115° C. or lower is preferable. Such a solvent can be easily separated from the produced copolymer and the collected trioxane by distillation. Furthermore, a part of or the entire amount of the comonomer, such as 1,3-dioxolane, may be used as a solvent. To maintain the activity of the sterically hindered phenol compound during the polymerization reaction, the sterically hindered phenol compound is preferably added in itself or added in a solution form to the inlet of the polymerization machine.

Examples of the sterically hindered phenol compound used in the polymerization step include dibutylhydroxytoluene, triethylene glycol-bis-3-(3-t-butyl-4-hydroxy-5-methylphenyl)propionate, pentaerythrityl-tetrakis-3-(3,5-di-t-butyl-4-hydroxyphenyl)propionate, hexamethylene bis[3-(3,5-di-t-butyl-4-hydroxyphenyl)propionate], 2,2'-methylene bis (6-t-butyl-4-methylphenol), 3,9-bis {2-[3-(3-t-butyl-4-hydroxy-5-methylphenyl]propionyloxy)-1,1-dimethylethyl}-2,4,8,10-tetraoxaspiro[5,5]undecane, N,N'-hexane-1,6-diylbis[3-(3,5-di-t-butyl-4-hydroxyphenyl) propionamide], 1,6-hexanediyl3,5-bis(1,1-dimethylethyl)-4-hydroxybenzenepropionate, and the like. At least one selected from the group consisting of these is preferable. Among these, at least one selected from the group consisting of triethylene glycol-bis-3-(3-t-butyl-4-hydroxy-5-methylphenyl)propionate, pentaerythrityl-tetrakis-3-(3,5-di-t-butyl-4-hydroxyphenyl)propionate, and 3,9-bis{2-[3-(3-t-butyl-4-hydroxy-5-methylphenyl]propionyloxy)-1,1-dimethylethyl}-2,4,8,10-tetraoxaspiro[5,5]undecane is preferably used, and triethylene glycol-bis-3-(3-t-butyl-4-hydroxy-5-methylphenyl)propionate is the most preferably used.

Termination of the polymerization reaction can be performed by adding and mixing a polymerization terminator to the polymerized mixture. That is, the method for producing an oxymethylene copolymer preferably further includes a step of adding a polymerization terminator. The polymerization terminator is typically used in a molten form, a solution form, or a suspension form. The mixing method is performed using a device that can be used for the polymerization reaction described above. As the mixing method, for the case of the batch method, the polymerization terminator is added to the polymerization machine after a certain time period has passed, and for the case of the continuous method, the polymerized mixture and the polymerization terminator are continuously supplied to the mixing device. Among these, the method of continuously mixing by using a static mixer type reactor having a static mixing element but having no drive section is suitable. As the static mixing element inside the static mixer type reactor, a static mixing element which is composed of two types of elements, that are in a form of a rectangular plate twisted clockwise by 180° and a form of a rectangular plate twisted counterclockwise by 180°, a static mixing element composed of planar criss-crossed lattice, and the like can be suitably used.

Examples of the polymerization terminator include amine compounds, such as primary amines, secondary amines, tertiary amines, alkylated melamines, and hindered amine compounds; trivalent organophosphorus compounds; and alkali metal salts, such as hydroxides of alkali metals and alcoholates of alkali metals, and alkaline earth metal salts, such as hydroxides of alkaline earth metals and alcoholates of alkaline earth metals. At least one selected from the group consisting of these is preferable. That is, the polymerization terminator is preferably at least one selected from the group consisting of amine compounds, hydroxides of alkali metals, alcoholates of alkali metals, hydroxides of alkaline earth metals, and alcoholates of alkaline earth metals. The polymerization terminator is used individually or in combination.

As the primary amine, n-propylamine, isopropylamine, n-butylamine, or the like is suitably used. As the secondary amine, diethylamine, di-n-propylamine, diisopropylamine, di-n-butylamine, piperidine, morpholine, or the like is suitably used. As the tertiary amine, triethylamine, tri-n-propylamine, triisopropylamine, tri-n-butylamine, or the like is suitably used. As the alkylated melamine, mono-, di-, tri-, tetra-, penta-, or hexa-methoxymethylmelamine, which is methoxymethyl-substituted melamine, a mixture thereof, or the like is suitably used. As the hindered amine compound, bis(2,2,6,6-tetramethyl-4-piperidinyl) sebacate, bis(1,2,2,6,6-pentamethyl-4-piperidinyl) sebacate, 1,2,3,4-butanetetracarboxylic acid tetrakis(2,2,6,6-tetramethyl-4-piperidinyl) ester, poly[[6-(1,1,3,3-tetramethylenebutyl)amino-1,3,5-triazine-2,4-diyl][(2,2,6,6-tetramethyl-4-piperidinyl)imino] hexamethylene[(2,2,6,6-tetramethyl-4-piperidinyl)imino], 1,2,2,6,6,-pentamethylpiperidine, dimethyl succinate-1-(2-hydroxyethyl)-4-hydroxy-2,2,6,6-tetramethylpiperidine polycondensates, N,N'-bis(3-aminopropyl)ethylenediamine-2,4-bis[N-butyl-N-(1,2,2,6,6-pentamethyl-4-piperidyl) amino]-1,3,5-triazine condensates, or the like is suitably used.

As the hydroxides or alcoholates of alkali metals or alkaline earth metals, lithium hydroxide, sodium hydroxide, potassium hydroxide, lithium methoxide, sodium methoxide, potassium methoxide, lithium ethoxide, sodium ethoxide, potassium ethoxide, magnesium hydroxide, calcium hydroxide, magnesium methoxide, calcium methoxide, magnesium ethoxide, calcium ethoxide, and the like are suitably used.

Among these, from the perspective of easy separation from monomers when unreacted monomers are separated by vaporization, at least one selected from the group consisting of hindered amine compounds, alkylated melamines, hydroxides of alkali metals, and alcoholates of alkali metals is more preferable. Among the compounds described above, as the hindered amine compound, bis(2,2,6,6-tetramethyl-4-piperidinyl) sebacate, bis(1,2,2,6,6-pentamethyl-4-piperidinyl) sebacate, dimethyl succinate/1-(2-hydroxyethyl)-4-hydroxy-2,2,6,6-tetramethylpiperidine polycondensates, and N,N'-bis(3-aminopropyl)ethylenediamine/2,4-bis[N-butyl-N-(1,2,2,6,6-pentamethyl-4-piperidyl)amino]-1,3,5-triazine condensates are more preferable. As the alkylated melamine, hexamethoxymethylmelamine is more preferable. As the hydroxide or alcoholate of an alkali metal, sodium hydroxide and sodium methoxide are more preferable. Of these, sodium methoxide is the most preferable.

Furthermore, a method of using an amine compound and a hydroxide or alcoholate of an alkali metal or alkaline earth metal in combination as a polymerization terminator is preferable since negative effects such as coloration or reduction in the molecular weight due to excessive amount of alkali metal or alkaline earth metal can be suppressed. Of these, a method of using an amine compound and sodium methoxide in combination is the most preferable.

The polymerization terminator is used in itself, in a solution form or in a suspension form. That is, all or part of the polymerization terminator may be used after dilution with a solvent. When the polymerization terminator is used in a solution form or a suspension form, the used solvent is not particularly limited. As the solvent, various aliphatic and aromatic organic solvents, such as acetone, methyl ethyl ketone, 1,2-dimethoxyethane, diethylene glycol dimethyl ether, triethylene glycol dimethyl ether, 1,4-dioxane, hexane, cyclohexane, heptane, benzene, toluene, xylene, methylene dichloride, and ethylene dichloride, as well as water and alcohol solvents can be used. Among these, aliphatic and aromatic organic solvents, such as acetone, methyl ethyl ketone, 1,2-dimethoxyethane, diethylene glycol dimethyl ether, triethylene glycol dimethyl ether, 1,4-dioxane, hexane, cyclohexane, heptane, benzene, toluene, and xylene, as well as water and alcohol solvents are preferable. Among these, although it is not a mandatory requirement in the present invention, a solvent having the boiling point at 1 atm of 115° C. or lower is preferable. Such a solvent can be easily separated from the produced copolymer and the collected trioxane by distillation. As the polymerization terminator, the comonomer or monomer, such as trioxane or 1,3-dioxolane, may be used as a solvent. Furthermore, addition of the polymerization terminator after diluting the polymerization terminator with separately produced polyacetal is also preferable.

The amount of the polymerization terminator added is typically in the range of 0.1 to 100 equivalents, preferably in the range of 1 to 10 equivalents, and most preferably in the range of 1 to 2 equivalents, relative to the amount of the added polymerization initiator. When the amount of the polymerization terminator added is 100 equivalents or less, coloration or reduction in the molecular weight due to decomposition is less likely to occur, and when the amount of the polymerization initiator added is 0.1 equivalents or greater, reduction in the molecular weight due to depolymerization is less likely to occur.

Note that "equivalent" of the polymerization terminator refers to the number of moles that is required to deactivate 1 mole of the polymerization initiator.

Furthermore, when an amine compound and a hydroxide or alcoholate of an alkali metal or alkaline earth metal are used in combination as the polymerization terminator, typically in the range of 0.1 to 100 equivalents, preferably in the range of 1 to 50 equivalents, and most preferably in the range of 1 to 10 equivalents, of the amine compound relative to the amount of the added polymerization initiator is used. Meanwhile, typically in the range of 0.001 to 50 equivalents, preferably in the range of 0.01 to 5 equivalents, and most preferably in the range of 0.1 to 2 equivalents, of the hydroxide or alcoholate of an alkali metal or alkaline earth metal is used. By use of 0.1 equivalents or greater of the amine compound in combination with the hydroxide or alcoholate of an alkali metal or alkaline earth metal, sufficient polymerization termination effect can be achieved even if the used amount of the hydroxide or alcoholate of an alkali metal or alkaline earth metal is reduced to 50 equivalents or less, as well as negative effects, such as reduction in the molecular weight and coloration due to excessive amount of alkali metal component or alkaline earth metal component, which is observed when only the hydroxide or alcoholate of an alkali metal or alkaline earth metal is used, can be suppressed.

The termination of the polymerization reaction is performed under pressurized conditions, which are the conditions pressurized at least to the vapor pressure of the inside or higher pressure, that is typically 0.15 to 50 MPa, and more preferably 0.15 to 20 MPa. The termination of the polymerization reaction is performed typically in the temperature range of 130 to 300° C., and more preferably in the temperature range of 135 to 250° C. The mixing time for adding the polymerization terminator to deactivate the polymerization initiator is typically 0.1 to 20 minutes, and more preferably 1 to 10 minutes.

When the method for producing an oxymethylene copolymer further includes a step of adding a polymerization terminator, a production method which continuously produces the oxymethylene copolymer using a continuous polymerization device, in which a static mixer type continuous polymerization machine having a static mixing element inside thereof and a polymerization terminator mixing machine are connected in series, is preferable.

Furthermore, the oxymethylene copolymer (hereinafter, also referred to as "polymerized mixture") after the termination of the polymerization typically contains 20 to 40% by mass of residual monomer and/or volatile components, such as formaldehyde and tetraoxane which are decomposition products. Furthermore, this oxymethylene copolymer typically contains 10% by mass or less of thermally unstable portion that generates formaldehyde upon heating. To remove these, the production method of the present invention preferably further includes, thereafter, a step of removing, as a gas component, at least a portion of the volatile component and the thermally unstable portion using a degasifier.

Examples of the degasifier include flash pots, single screw or twin screw extruders with a vent, horizontal high viscosity liquid degasifiers with single screw or twin screw blade having a special shape (e.g., spectacle-shaped blade polymerizer, manufactured by Hitachi Plant Technologies, Ltd.), thin film evaporators, spray dryers, strand degassers, and the like. At least one selected from the group consisting of these is preferable. Among these, it is more preferable to use the degasifier(s) selected from the group consisting of flash pots, single screw or twin screw extruders with a vent, horizontal high viscosity liquid degasifiers with single screw or twin screw blade having a special shape, and the like, alone or in a combination of multiple devices. The volatile component (gas component) separated by the degasifier can be reused in the polymerization step by being liquefied via pressurization or a condensing device, or by being absorbed by an absorbing device, as is or after purified by distillation or the like.

When the method for producing an oxymethylene copolymer further includes a step of removing, as a gas component, at least a part of the volatile component and the thermally unstable portions, the temperature in the step is, for example, 130 to 300° C., and preferably 160 to 250° C. Furthermore, the pressure in the step is, for example, 0.00001 to 50 MPa, and preferably 0.0001 to 5 MPa.

Therefore, the method for producing an oxymethylene copolymer preferably further includes a step of removing, as a gas component, at least a portion of volatile component and thermally unstable portions of a polymerized mixture, which is obtained in the polymerization step, at a temperature of 130 to 300° C. under a pressure of 0.00001 to 50 MPa in at least one degasifier selected from the group consisting of flash pots, single screw or twin screw extruders with a vent, and horizontal high viscosity liquid degasifiers with single screw or twin screw blade. Furthermore, the production method preferably further includes a step of liquefying the removed gas component to reuse a part or all of the gas components in a raw material trioxane. The method of liquefying the gas component is not particularly limited and can be suitably selected from methods that are typically used. For example, the gas component can be liquefied by being pressurized.

After removing the volatile component and the thermally unstable portion as a gas component by these methods, the copolymer can be pelletized to obtain a moldable oxymethylene copolymer that exhibits excellent thermal stability.

Furthermore, in the step of removing the volatile component and the thermally unstable portion described above or in a following step thereof, a stabilizer, such as an antioxidant or thermal stabilizer, can be added and mixed using a melt blending device that is typically used industrially, such as a single screw or twin screw extruder, horizontal high viscosity liquid degasifiers with single screw or twin screw blade having a special shape, or a static mixer.

Examples of the antioxidant include sterically hindered phenol compounds, such as triethylene glycol-bis-3-(3-t-butyl-4-hydroxy-5-methylphenyl)propionate, pentaerythrityl-tetrakis-3-(3,5-di-t-butyl-4-hydroxyphenyl)propionate, 2,2'-methylene bis(6-t-butyl-4-methylphenol), 3,9-bis {2-[3-(3-t-butyl-4-hydroxy-5-methylphenyl]propionyloxy)-1,1-dimethylethyl}-2,4,8,10-tetraoxaspiro[5,5]undecane, N,N'-hexane-1,6-diylbis[3-(3,5-di-t-butyl-4-hydroxyphenyl) propionamide], and 1,6-hexanediyl 3,5-bis(1,1-dimethylethyl)-4-hydroxybenzenepropionate. At least one selected from the group consisting of these is preferable.

Examples of the thermal stabilizer include organic compounds, such as triazine compounds, such as melamine, methylolmelamine, benzoguanamine, cyanoguanidine, and N,N-diarylmelamine, polyamide compounds, urea derivatives, and urethane compounds; inorganic acid salts, hydroxides, or organic acid salts of sodium, potassium, calcium, magnesium, or barium; and the like. Of these, at least one stabilizer selected from the group consisting of sterically hindered phenol compounds and triazine compounds is preferably used. A combination of triethylene glycol-bis-3-(3-t-butyl-4-hydroxy-5-methylphenyl)propionate and melamine is the most preferable.

The method for producing an oxymethylene copolymer preferably further includes a step of adding at least one stabilizer selected from the group consisting of sterically hindered phenol compounds and triazine compounds.

When the stabilizer is added to the copolymer, the amount of the stabilizer added is not particularly limited and can be suitably selected based on the purpose or the like. The amount of the stabilizer added is, for example, 0.0001 to 10% by mass, and preferably 0.001 to 5% by mass, relative to the amount of the copolymer.

The oxymethylene copolymer pellet that is the end product obtained by the production method of the present invention contains 1.5% by mass or less, and typically 1.4 to 0.1% by mass, of unstable portion measured by the method such as weight loss percentage upon heating (M value) that is described below. The proportion of the unstable portion is small.

By the production method of the present invention described above in detail, the obtained oxymethylene copolymer exhibits excellent properties as same as those of oxymethylene copolymers obtained by conventional methods, and the obtained oxymethylene copolymer can be used for the same applications as those of oxymethylene copolymers obtained by conventional methods.

Furthermore, to the oxymethylene copolymer produced by the production method of the present invention, additives such as colorants, nucleating agents, plasticizers, mold releasing agents, brightening agents, antistatic agents, such as polyethylene glycol and glycerine, and photostabilizers, such as benzophenone-based compounds and hindered amine-based compounds, can be added as desired.

EXAMPLES

Although examples of the present invention and comparative examples will be described below, the present invention is not limited to these. Terms and measurement methods that are used in the examples and comparative examples will be described below.

Evaluation of the molecular weight was conducted using a value of intrinsic viscosity or melt flow index as criteria.

(1) Intrinsic viscosity: Measurement was performed by dissolving 0.1% by mass of the oxymethylene copolymer in p-chlorophenol to which 2% by mass of α-pinene and 0.1% by mass of tri-n-butylamine had added, and then measuring the mixture at 60° C. using an Ostwald viscometer.

(2) Melt flow index (MI value): Measurement was performed in accordance with ASTM-D1238 (190° C., under a load of 2.16 kg).

(3) Weight loss percentage upon heating (M value): Weight loss percentage (%) for the case where a pellet obtained by extrusion and kneading of the stabilized oxymethylene copolymer was placed in a test tube and then heated under a reduced pressure of 10 Torr, after purged with nitrogen, at 240° C. for 2 hours is shown. This weight loss percentage upon heating (M value) becomes smaller as the thermal stability becomes higher.

Preparation of Polymerization Initiator

Perchloric acid solution: A perchloric acid-diethylene glycol dimethyl ether solution was prepared immediately before use by diluting perchloric acid (70% by mass aqueous solution) with diethylene glycol dimethyl ether.

Trifluoromethanesulfonic acid solution: A trifluoromethanesulfonic acid-diethylene glycol dimethyl ether solution was prepared immediately before use by diluting trifluoromethanesulfonic acid with diethylene glycol dimethyl ether.

Phosphotungstic acid solution: A phosphotungstic acid-diethylene glycol dimethyl ether solution was prepared immediately before use by dissolving phosphotungstic acid ($H_3[PW_{12}O_{40}] \cdot 30H_2O$, M.W.=3421) in diethylene glycol dimethyl ether.

Preparation of Protic Acid Salt

Perchlorate solution: A $NaClO_4$-diethylene glycol dimethyl ether solution was prepared immediately before the polymerization reaction by reacting sodium methoxide (28% by mass methanol solution) and perchloric acid (70% by mass aqueous solution) at a mole ratio of 1:1 in diethylene glycol dimethyl ether at 25° C. in the manner so that a salt is formed. A $Ca(ClO_4)_2$-diethylene glycol dimethyl ether solution was prepared immediately before the polymerization reaction by reacting calcium methoxide and perchloric acid (70% by mass aqueous solution) at a mole ratio of 1:2 in diethylene glycol dimethyl ether at 25° C. in the manner so that a salt is formed.

Trifluoromethanesulfonate solution: A triethylamine trifluoromethanesulfonate-diethylene glycol dimethyl ether solution was prepared immediately before the polymerization reaction by reacting triethylamine and trifluoromethanesulfonic acid at a mole ratio of 1:1 in diethylene glycol dimethyl ether at 25° C. in the manner so that a salt is formed.

Phosphotungstate solution: A sodium phosphotungstate ($Na_3[PW_{12}O_{40}] \cdot 30H_2O$, M.W.=3487)-diethylene glycol dimethyl ether solution was prepared immediately before the polymerization reaction by reacting sodium methoxide (28% by mass methanol solution) and phosphotungstic acid ($H_3[PW_{12}O_{40}] \cdot 30H_2O$, M.W.=3421) at a mole ratio of 3:1 in diethylene glycol dimethyl ether at 25° C. in the manner so that a salt is formed.

Examples 1, 2, and 4, and Comparative Examples 1 to 5

The oxymethylene copolymer was produced by a batch type polymerization method using, as a polymerization device, a pressure-resistant reactor that is formed of SUS316, that has an internal volume of 500 mL, and that has a heater and stirrer. The reactor was heated to 80° C. and the inside was dried and purged with dry nitrogen. Thereafter, 200 g of trioxane (contained, as a stabilizer, 100 ppm by mass of hexamethylene bis[3-(3,5-di-t-butyl-4-hydroxyphenyl)propionate] which is a sterically hindered phenol compound. Each of the impurities, such as water, formic acid, and formaldehyde, was 20 ppm by mass or less) and 8 g of 1,3-dioxolane, which was the comonomer, were charged and pressurized to 2.5 MPaG using high pressure nitrogen. The mixture was stirred and heated until the internal temperature reaches 150° C. Predetermined amounts, relative to the trioxane, of a polymerization initiator that was a 3% by mass diethylene glycol dimethyl ether solution and a protic acid salt that was a 0.5% by mass diethylene glycol dimethyl ether solution were mixed immediately before use and injected together with 1 mL of benzene using a pump to start the polymerization. The internal pressure increased to 3 to 4 MPaG. After the polymerization was allowed for a predetermined time period, the amount that was 10 times the molar amount of the used polymerization initiator of sodium methoxide was injected as a diethylene glycol dimethyl ether solution (solution concentration: 5 mmol/mL) together with 1 mL of benzene using a pump, and mixed for 5 minutes to terminate the polymerization. By releasing the pressure, unreacted monomers and decomposition products were vaporized to obtain the oxymethylene copolymer.

In Examples 1, 2, and 4 and Comparative Examples 1, and 3 to 5, the internal temperatures lowered by 2 to 4° C. after the start of the polymerization; however, the internal temperatures of 146 to 152° C. were maintained thereafter. In Comparative Example 2, no oxymethylene copolymer was produced and the internal temperature was not changed. After the obtained oxymethylene copolymers were crushed and low-boiling substances were removed under reduced pressure, the polymerization yields and the intrinsic viscosities were measured, and the results are shown in Table 1 and Table 2.

Example 3

Similar operation as the operation in Example 1 was performed except for, after the polymerization was allowed for a predetermined time period, a mixture containing the amount that was 0.9 times the molar amount of the used polymerization initiator of sodium methoxide and the amount that was 10 times the molar amount of the hexamethoxymethylmelamine was injected as a diethylene glycol dimethyl ether solution (solution concentration: 5 mmol/mL) together with 1 mL of benzene using a pump, and mixed for 5 minutes to terminate the polymerization. The internal temperature lowered by 2 to 4° C. after the start of the polymerization; however, the internal temperature of 146 to 152° C. was maintained thereafter. The polymerization yield and the intrinsic viscosity were measured, and the results are shown in Table 1.

Example 5

Similar operation as the operation in Example 1 was performed except for changing the internal temperature at the start of the polymerization to 140° C. The internal temperature lowered by 1° C. after the start of the polymerization; however, the internal temperature of 139 to 144° C. was maintained thereafter. The polymerization yield and the intrinsic viscosity were measured, and the results are shown in Table 3.

Comparative Example 6

Similar operation as the operation in Comparative Example 1 was performed except for changing the internal temperature at the start of the polymerization to 140° C. The internal temperature lowered by 2° C. after the start of the polymerization; however, the internal temperature of 138 to 140° C. was maintained thereafter. The polymerization yield and the intrinsic viscosity were measured, and the results are shown in Table 3.

Example 6

Similar operation as the operation in Example 1 was performed except for changing the internal temperature at the start of the polymerization to 165° C., and mixing acetone to predetermined amounts, relative to the trioxane, of a polymerization initiator (as a 3% by mass diethylene glycol dimethyl ether solution) and a protic acid salt (as a 0.5% by mass diethylene glycol dimethyl ether solution) immediately before use, and injecting the mixture together with 1 mL of benzene using a pump to start the polymerization. The internal temperature lowered by 4° C. after the start of the polymerization; however, the internal temperature of 161 to 167° C. was maintained thereafter. The polymerization yield and the intrinsic viscosity were measured, and the results are shown in Table 4.

Comparative Example 7

Similar operation as the operation in Comparative Example 1 was performed except for changing the internal temperature at the start of the polymerization to 165° C. The internal temperature lowered by 2° C. after the start of the polymerization; however, the internal temperature of 163 to 167° C. was maintained thereafter. The polymerization yield and the intrinsic viscosity were measured, and the results are shown in Table 4.

Comparative Examples 8 to 11

The oxymethylene copolymer was produced by a batch type polymerization method using, as a polymerization device, a desk top twin screw kneader with the internal volume of 1 L having a jacket, an inspection window, and two Z-shaped blades. After warm water at 70° C. was circulated in the jacket and the inside was heated and dried using high temperature air, a lid was placed to purge the system with nitrogen. From the raw material charging port, 300 g of trioxane (contained, as a stabilizer, 100 ppm by mass of hexamethylene bis[3-(3,5-di-t-butyl-4-hydroxyphenyl)propionate] which is a sterically hindered phenol compound. Each of the impurities, such as water, formic acid, and formaldehyde, was 20 ppm by mass or less) and 12 g of 1,3-dioxolane, which was the comonomer, were charged. While the mixture was stirred by the Z-shaped blades, predetermined amounts, relative to the trioxane, of a polymerization initiator (as a 0.008% by mass diethylene glycol dimethyl ether solution) and a protic acid salt (as a 0.008% by mass diethylene glycol dimethyl ether solution) were mixed immediately before use and added to start the polymerization. After 4 minutes of the polymerization, the amount that was 10 times the molar amount of the used polymerization initiator of triethylamine was added as a benzene solution (solution concentration: 5 mmol/mL) to the polymerization device using a syringe and mixed for 15 minutes to terminate the polymerization, and then the oxymethylene copolymer was collected.

In Comparative Examples 8 to 10, the copolymers were deposited and the temperatures of the polymerized mixtures increased by 20° C. or more after the start of the polymerization. In Comparative Example 11, the polymerization yield was low, and almost no change was observed in the temperature of the polymerized mixture. The maximum temperature of the inside is shown in Table 5. After the oxymethylene copolymers were crushed and low-boiling substances were removed under reduced pressure, the polymerization yields and the intrinsic viscosities were measured, and the results are shown in Table 5.

Example 7

As a continuous polymerization device, a first preheater, a polymerization machine, a polymerization terminator mixing machine, a termination reactor, and a second preheater of a static mixer type continuous polymerization device that has a heating jacket and that is provided with a static mixer type static mixing element inside thereof were connected in series with pipes to produce the oxymethylene copolymer. To the inlet of the first preheater, 2 kg/hr of trioxane (contained, as a stabilizer, 100 ppm by mass of hexamethylene bis[3-(3,5-di-t-butyl-4-hydroxyphenyl)propionate] which is a sterically hindered phenol compound. Each of the impurities, such as water, formic acid, and formaldehyde, was 20 ppm by mass or less), 0.08 kg/hr of 1,3-dioxolane as a comonomer, and the amount, that is required to adjust the intrinsic viscosity to 1.1 to 1.5 dl/g, of methylal, as a molecular weight modifier, as a diethylene glycol dimethyl ether solution were supplied by a dual plunger pump and heated to the polymerization temperature of 150° C. Thereafter, 2.5 ppm by mass, relative to the amount of the trioxane, of perchloric acid, as a polymerization initiator, as a 3% by mass perchloric acid-diethylene glycol dimethyl ether solution and 3.0 ppm by mass of sodium perchlorate as a 0.5% by mass $NaClO_4$-diethylene glycol dimethyl ether solution were mixed immediately before use and continuously supplied to a connecting pipe portion between the first preheater and the polymerization machine using a dual plunger pump to sufficiently mix with the monomer in the pipe. The mixture was then supplied to the polymerization machine. The jacket temperature of the polymerization machine was the same as the polymerization temperature, and the average residence time in the polymerization machine was 2 minutes. Thereafter, the amount that was 2 times the equivalent amount of the polymerization initiator of sodium methoxide as a diethylene glycol dimethyl ether solution (solution concentration: 5 mmol/mL) was continuously supplied to a connecting pipe portion between the polymerization machine and the polymerization terminator mixing machine using a dual plunger pump. After being mixed by the polymerization terminator mixing machine, the mixture was supplied to the termination reactor. The jacket temperatures of the polymerization terminator mixing machine and the termination reactor were the same as the polymerization temperature, and the total of the average residence time was 3 minutes. Thereafter, the polymerized mixture was supplied to the second preheater and heated to 235° C. Thereafter, unreacted monomers and decomposition products were vaporized by releasing the pressure using a flash pot at the atmospheric pressure, and low-boiling substances were removed under reduced pressure to collect the oxymethylene copolymer. Here, 50% by mass of the gas of the unreacted monomers and decomposition products vaporized at the atmospheric pressure were reused in raw material trioxane. The total used amount of diethylene glycol dimethyl ether was 1% by mass or less relative to the amount of the trioxane. Note that a back pressure valve was provided at the outlet of the second preheater to adjust the flow rate to be stable.

Example 8

To 100 parts by mass of the oxymethylene copolymer obtained in Example 7, 0.1 parts by mass of melamine and 0.3 parts by mass of triethylene glycol-bis-3-(3-t-butyl-4-hydroxy-5-methylphenyl)propionate were added and mixed. Thereafter, the mixture was supplied to a twin screw extruder with a vent and melt-kneaded at 200° C. under reduced pressure of 50 mmHg. Then, the mixture was supplied to a surface renewal-type mixer which has two rotating shafts inside the mixer, each shaft having a plurality of scraper blades fitted thereto, and the blades are fitted so that the blades are not in contact when the shafts are rotated in different directions, and arranged so that the shafts are rotated while maintaining a slight gap between the ends of the blades and the inner surface of the casing or the both shafts. The surface renewal-type mixer has a function such that the rotation of the shafts kneads the polymer and constantly renews the surface of the molten polymer so that the volatile components easily volatilize. The supplied mixture was stabilized at 220° C. and again under reduced pressure of 50 mmHg. The average residence time from the inlet of the twin screw extruder to the outlet of the surface renewal-type mixer was 15 minutes. The stabilized oxymethylene copolymer was extruded from a dice and pelletized. The intrinsic viscosity of the obtained pellet was 1.4 dl/g, the MI value was 9.5, and the M value was 0.8%.

TABLE 1

| | Temperature at start of polymerization (° C.) | Polymerization time (min) | Polymerization initiator | | Protic acid salt | | Polymerization yield (wt %) | Intrinsic viscosity (dl/g) |
|---|---|---|---|---|---|---|---|---|
| | | | Type | Addition amount (ppm) | Type | Addition amount (ppm) | | |
| Example 1 | 150 | 2 | $HClO_4$ | 2.5 | $NaClO_4$ | 3.0 | 69 | 2.1 |
| Example 2 | 150 | 2 | $HClO_4$ | 2.5 | $Ca(ClO_4)_2$ | 3.0 | 70 | 1.8 |
| Example 3 | 150 | 2 | $HClO_4$ | 2.5 | $NaClO_4$ | 3.0 | 70 | 2.0 |
| Comparative example 1 | 150 | 2 | $HClO_4$ | 2.5 | — | — | 21 | 1.4 |
| Comparative example 2 | 150 | 2 | — | — | $NaClO_4$ | 3.0 | Not polymerized | |
| Comparative example 3 | 150 | 2 | PTA | 25 | — | — | 63 | 1.2 |
| Comparative example 4 | 150 | 2 | PTA | 25 | SPT | 25.0 | 17 | 0.5 |

PTA: Phosphotungstic acid $H_3[PW_{12}O_{40}] \cdot 30H_2O$
SPT: Sodium phosphotungstate $Na_3[PW_{12}O_{40}] \cdot 30H_2O$

TABLE 2

|  | Temperature at start of polymerization (° C.) | Polymerization time (min) | Polymerization initiator Type | Addition amount (ppm) | Protic acid salt Type | Addition amount (ppm) | Polymerization yield (wt %) | Intrinsic viscosity (dl/g) |
|---|---|---|---|---|---|---|---|---|
| Example 4 | 150 | 2 | $CF_3SO_3H$ | 3.7 | TEAT | 6.2 | 71 | 2.0 |
| Comparative example 5 | 150 | 2 | $CF_3SO_3H$ | 3.7 | — | — | 42 | 1.4 |

TEAT: Triethylammonium triflate $CF_3SO_3 \cdot NHEt_3$

TABLE 3

|  | Temperature at start of polymerization (° C.) | Polymerization time (min) | Polymerization initiator Type | Addition amount (ppm) | Protic acid salt Type | Addition amount (ppm) | Polymerization Yield (wt %) | Intrinsic viscosity (dl/g) |
|---|---|---|---|---|---|---|---|---|
| Example 5 | 140 | 2 | $HClO_4$ | 2.5 | $NaClO_4$ | 3.0 | 70 | 1.1 |
| Comparative example 6 | 140 | 2 | $HClO_4$ | 2.5 | — | — | 62 | 0.7 |

TABLE 4

|  | Temperature at start of polymerization (° C.) | Polymerization time (min) | Polymerization initiator Type | Addition amount (ppm) | Protic acid salt Type | Addition amount (ppm) | Ketone compound Type | Addition amount (ppm) | Polymerization yield (wt %) | Intrinsic viscosity (dl/g) |
|---|---|---|---|---|---|---|---|---|---|---|
| Example 6 | 165 | 2 | $HClO_4$ | 2.5 | $NaClO_4$ | 3.0 | Acetone | 700 | 57 | 1.5 |
| Comparative example 7 | 165 | 2 | $HClO_4$ | 2.5 | — | — | — | — | 26 | 1.1 |

TABLE 5

|  | Temperature at start of polymerization (° C.) | Polymerization time (min) | Polymerization catalyst Type | Addition amount (ppm) | Protic acid salt Type | Addition amount (ppm) | Maximum temperature (° C.) | Polymerization yield (wt %) | Intrinsic viscosity (dl/g) |
|---|---|---|---|---|---|---|---|---|---|
| Comparative example 8 | 70 | 4 | $HClO_4$ | 2.5 | — | — | 110 | 83 | 2.3 |
| Comparative example 9 | 70 | 4 | $HClO_4$ | 2.5 | $NaClO_4$ | 3.0 | 93 | 63 | 1.6 |
| Comparative example 10 | 70 | 4 | $CF_3SO_3H$ | 3.7 | — | — | 93 | 70 | 2.8 |
| Comparative example 11 | 70 | 4 | $CF_3SO_3H$ | 3.7 | TEAT | 6.2 | 72 | 6.6 | 1.1 |

TEAT: Diethylammonium triflate $CF_3SO_3 \cdot NHEt_3$

Examples 1 to 4, in which polymerization was performed while a protic acid and a protic acid salt thereof having a molecular weight of 1000 or less were allowed to coexist, exhibited superior polymerization yields and superior intrinsic viscosities compared to those of Comparative Examples 1 to 5. Also for Example 5 and Comparative Example 6, in which the temperature at the start of the polymerization was 140° C., Example 5, in which polymerization was performed while a protic acid and a protic acid salt thereof having a molecular weight of 1000 or less were allowed to coexist, exhibited superior polymerization yield and superior intrinsic viscosity compared to those of Comparative Example 6.

Example 6, in which the temperature at the start of the polymerization was 165° C. and polymerization was performed while a protic acid and a protic acid salt thereof having a molecular weight of 1000 or less, and a ketone compound were allowed to coexist, exhibited superior polymerization yield and superior intrinsic viscosity compared to those of Comparative Example 7. In Comparative Examples 8 to 11 in which the temperature at the start of the polymerization was 70° C., Comparative Examples 9 and 11, in which polymerization was performed while a protic acid and a protic acid salt thereof having a molecular weight of 1000 or less were allowed to coexist, exhibited inferior polymerization yields and inferior intrinsic viscosities compared to those of Comparative Examples 8 and 10, in which the protic acid salt was not allowed to coexist. Furthermore, for Examples 1 to 6 and Comparative Examples 1 and 3 to 7, in which the temperature at the start of the polymerization was 140° C. or higher, the temperatures lowered by 1 to 4° C. after the start of the polymerization, and the temperature increased to only 4° C. higher than the temperature at the start of the polymerization thereafter. On the other hand, for Comparative Examples 8 to 10, in which the temperature at the start of the polymerization was 70° C., depositions of the copolymer were visually observed through the inspection window after the start of the polymerization and the temperatures increased to 20° C. higher than the temperature at the start of the polymerization or to an even higher temperature due to the heat of crystallization of the copolymer. Therefore, in Examples 1 to 6 in which the temperature at the start of the polymerization was 140° C. or higher, it is conceived that deposition of the copolymer did not occur. Furthermore, although the temperature at the start of the polymerization was 140° C. or higher, when a protic acid having a molecular weight exceeding 1000 and a salt thereof were used, as in Comparative Examples 3 and 4, the effect of adding a protic acid salt was not exhibited. Therefore, increase in the intrinsic viscosity due to the use of protic acid having a molecular weight of 1000 or less as a polymerization initiator and due to the addition of a protic acid salt is only observed in the temperatures where the produced copolymer can be maintained at a liquid state. In Examples 7 and 8, a protic acid and a protic acid salt thereof having a molecular weight of 1000 or less were added and the operation was performed under conditions that are assumed for the use of actual manufacturing facilities to confirm that the quality, such as intrinsic viscosity, MI value, and M value, of the end product had practically no problems.

The whole of the disclosures of Japanese Patent Application No. 2013-137734 and Japanese Patent Application No. 2013-137735 are incorporated into the present specification by reference.

All the documents, patent applications, and technical standards described in the present specification are incorporated into the present specification by reference to the same extent as that in the case where it is specifically and individually shown that each of the documents, patent applications, and technical standards is incorporated into the present specification by reference.

The invention claimed is:

1. A method for producing an oxymethylene copolymer, the method comprising:
    cationically polymerizing trioxane and a comonomer at a polymerization temperature of 140° C. to 165° C. in the presence of at least one protic acid salt selected from the group consisting of perchloric acid salts and at least one polymerization initiator selected from the group consisting of perchloric acid, acid anhydrides thereof, and ester compounds thereof, and
    charging at least one polymerization terminator;
    wherein the content of the at least one polymerization initiator is 0.01 ppm by mass to 100 ppm by mass relative to the content of the trioxane, and the mole ratio of the at least one polymerization initiator to the at least one protic acid salt is in the range of 1:0.01 to 1:5; and
    wherein the polymerization reaction is performed while the polymerization temperature is maintained from charging of the at least one polymerization initiator till the charging of the at least one polymerization terminator so that a maximum temperature difference from the time of the charging the at least one polymerization initiator until the time of charging the at least one polymerization terminator is less than 20° C.

2. The method for producing an oxymethylene copolymer according to claim 1, wherein the polymerization is performed in the presence of at least one ketone compound.

3. The method for producing an oxymethylene copolymer according to claim 1, wherein the polymerization is performed in the presence of at least one molecular weight modifier, and the content of the at least one molecular weight modifier is 0.01 ppm by mass to 10% by mass relative to the content of the trioxane.

4. The method for producing an oxymethylene copolymer according to claim 1, the method further comprising:
    adding all or part of the at least one polymerization initiator and the at least one protic acid salt that are diluted with a solvent having the boiling point at 1 atm of 115° C. or lower.

5. The method for producing an oxymethylene copolymer according to claim 1, wherein the at least one polymerization terminator is at least one selected from the group consisting of amine compounds, hydroxides of alkali metals, alcoholates of alkali metals, hydroxides of alkaline earth metals, and alcoholates of alkaline earth metals.

6. The method for producing an oxymethylene copolymer according to claim 1, wherein the amount of the at least one polymerization terminator added is 0.1 to 100 equivalents relative to the amount of the polymerization initiator.

7. The method for producing an oxymethylene copolymer according to claim 1, the method further comprising:
    adding all or part of the at least one polymerization terminator that is diluted with a solvent having the boiling point at 1 atm of 115° C. or lower.

8. The method for producing an oxymethylene copolymer according to claim 1, wherein the method continuously produces the oxymethylene copolymer using a continuous polymerization device in which a static mixer continuous polymerization machine having a static mixing element inside thereof and a polymerization terminator mixing machine are connected in series.

9. The method for producing an oxymethylene copolymer according to claim 1, the method further comprising adding at least one stabilizer selected from the group consisting of sterically hindered phenol compounds and triazine compounds.

10. The method for producing an oxymethylene copolymer according to claim 1, the method further comprising:
    removing, as a gas component, at least a portion of volatile components and thermally unstable portions of a polymerized mixture that has been polymerized at a temperature of 130 to 300° C. under a pressure of 0.00001 to 50 MPa in at least one degasifier selected from the group consisting of flash pots, single screw or twin screw extruders with a vent, and horizontal high viscosity liquid degasifiers with single screw or twin screw blade.

11. The method for producing an oxymethylene copolymer according to claim 10, the method further comprising:
    liquefying the gas component to reuse a part or all of the gas component in a raw material trioxane.

* * * * *